(12) United States Patent
Chartrand

(10) Patent No.: US 11,314,489 B1
(45) Date of Patent: Apr. 26, 2022

(54) AUTOMATED AUTHORING OF SOFTWARE SOLUTIONS BY FIRST ANALYZING AND RESOLVING ANOMALIES IN A DATA MODEL

(71) Applicant: 27 Software U.S. Inc., Mooresville, NC (US)

(72) Inventor: Christopher Zee Chartrand, Brantford (CA)

(73) Assignee: 27 Software U.S. Inc., Mooresville, NC (US)

( * ) Notice: Subject to any disclaimer, the term of this patent is extended or adjusted under 35 U.S.C. 154(b) by 0 days.

(21) Appl. No.: 17/232,444

(22) Filed: Apr. 16, 2021

(51) Int. Cl.
*G06F 8/35* (2018.01)
*G06F 8/77* (2018.01)
*G06F 8/36* (2018.01)

(52) U.S. Cl.
CPC .............. *G06F 8/35* (2013.01); *G06F 8/36* (2013.01); *G06F 8/77* (2013.01)

(58) Field of Classification Search
None
See application file for complete search history.

(56) References Cited

U.S. PATENT DOCUMENTS

| | | | |
|---|---|---|---|
| 7,062,502 B1 | 6/2006 | Kesler | |
| 7,720,872 B1 | 5/2010 | Biere et al. | |
| 9,244,971 B1 | 1/2016 | Kalki | |
| 10,140,319 B2 * | 11/2018 | Widjanarko | G06F 16/212 |
| 10,853,161 B2 * | 12/2020 | Ahad | H04L 41/5038 |
| 2004/0249950 A1 | 12/2004 | Christensen et al. | |
| 2004/0254939 A1 * | 12/2004 | Dettinger | G06F 16/2457 |
| 2005/0091227 A1 | 4/2005 | McCollum | |
| 2005/0203940 A1 | 9/2005 | Farrar et al. | |
| 2006/0041877 A1 | 2/2006 | Harsh et al. | |
| 2006/0179025 A1 * | 8/2006 | Bechtel | G06N 5/025 706/45 |
| 2007/0208764 A1 * | 9/2007 | Grisinger | G06F 16/2448 |
| 2009/0313613 A1 | 12/2009 | Ben-Artzi et al. | |

(Continued)

FOREIGN PATENT DOCUMENTS

| | | | |
|---|---|---|---|
| CN | 111159171 A | * | 5/2020 |
| WO | 2021011691 A1 | | 1/2021 |

OTHER PUBLICATIONS

DXterity, "Application Modernization", 2019, DXterity Solutions (Year: 2019).*

(Continued)

*Primary Examiner* — Hossain M Morshed
(74) *Attorney, Agent, or Firm* — David J. Thibodeau, Jr.; VLP Law Group LLP

(57) ABSTRACT

Before generating code from an abstract model of a data store, the model is first analyzed to detect normalization, rationalization, naming conventions, structure conventions, and other anomalies. The analysis is scored, and the score may be weighted. The analysis also suggests scripted solutions for resolving the discovered anomalies. A developer may then choose to implement one or more of the suggested solutions prior to code generation. The score may be compared to a threshold and result used to gate subsequent actions. For example, generation of code from the abstract model may be prevented until such time as anomalies are sufficiently addressed so that the score meets a minimum threshold score.

23 Claims, 14 Drawing Sheets

(56) References Cited

U.S. PATENT DOCUMENTS

| | | | |
|---|---|---|---|
| 2010/0082646 A1* | 4/2010 | Meek | G06F 16/252 |
| | | | 707/752 |
| 2010/0138398 A1* | 6/2010 | Yoshizawa | G06F 16/23 |
| | | | 707/812 |
| 2011/0088011 A1 | 4/2011 | Ouali | |
| 2012/0311345 A1 | 12/2012 | Dhuse et al. | |
| 2013/0145348 A1 | 6/2013 | Agovic et al. | |
| 2014/0280047 A1* | 9/2014 | Shukla | G06F 16/248 |
| | | | 707/769 |
| 2014/0289702 A1 | 9/2014 | McMahon et al. | |
| 2015/0120729 A1 | 4/2015 | Slade | |
| 2016/0026461 A1 | 1/2016 | Bannister et al. | |
| 2017/0161138 A1* | 6/2017 | Oleynikov | G06F 11/0787 |
| 2018/0129988 A1 | 5/2018 | O'Connell | |
| 2019/0012354 A1 | 1/2019 | Wakana et al. | |
| 2019/0155225 A1* | 5/2019 | Kothandaraman | G06N 3/006 |
| 2019/0182120 A1* | 6/2019 | Coccia | H04L 43/08 |
| 2019/0228552 A1* | 7/2019 | Lee | G06T 11/60 |
| 2019/0236282 A1* | 8/2019 | Hulick, Jr. | G06F 16/951 |
| 2019/0266170 A1* | 8/2019 | Hazel | G06F 16/221 |
| 2019/0340287 A1 | 11/2019 | Tamjidi et al. | |
| 2020/0106658 A1 | 4/2020 | Chandrasekhar et al. | |
| 2020/0242532 A1* | 7/2020 | Kawamoto | G06Q 10/06393 |
| 2020/0257614 A1* | 8/2020 | Davis | G06F 11/3636 |
| 2020/0387372 A1 | 12/2020 | Kalavathy et al. | |
| 2021/0170693 A1* | 6/2021 | Sinclair | B33Y 50/02 |

OTHER PUBLICATIONS

Manaranka, "Your Guide to Data Quality Management", 2020, Data Analytics (Year: 2020).*

Gill, "Machine Learning Observability and Monitoring", 2020, Published by akira.ai/blog (Year: 2020).*

Spalka, "A comprehensive Approach to Anomaly Detection in Relational Database", Data and Applications Security 2005, LNCS 3654, pp. 207-221 , 2005. © IFIP International Federation for Information Processing 2005 (Year: 2005).*

IBM, "Data Modeling", 2020, IBM Cloud (Year: 2020).*

DXterity, "Application Modernization", 2019, DXterity (Year: 2019).*

Spalka, "A Comprehensive Approach to Anomaly Detection in Relational Databases", 2005, IFIP International Federation for Information Processing (Year: 2005).*

"Application Modernization" White Paper, DXterity Solutions, pp. 1-10, (2019).

* cited by examiner

Fig. 10

AUTOMATED AUTHORING OF SOFTWARE SOLUTIONS BY FIRST ANALYZING AND RESOLVING ANOMALIES IN A DATA MODEL

CROSS REFERENCE TO RELATED APPLICATIONS

This application is related to two co-pending U.S. Patent Applications entitled "Automated Authoring of Software Solutions From a Data Model" and "Automated Authoring of Software Solutions From a Data Model with Related Patterns", each of which are filed on the same day as this application, and each of which are hereby incorporated by reference.

BACKGROUND

The world is undergoing a digital transformation; using data to become faster, cheaper, smarter and more convenient to customers. Companies, schools, churches, and governments around the world are collectively investing trillions of US dollars each year in technology to become more competitive and more profitable.

High quality software applications are core to a successful digital transformation. Here are some types of software projects that are part of nearly every such process:

New software applications and prototyping: Quickly-built prototypes of software programs initially prove that new business models can work. The prototypes are typically then re-written into much larger and scalable enterprise software applications. New software applications that are often used to disrupt older business models and large applications can take 18-24 months to construct using teams of developers.

Legacy software programs: Millions of decades-old programs are expensive to maintain and the programmers who built the programs have either died or retired, making it risky to touch, change, or upgrade those legacy software applications without experienced staff on hand. Old programs within a company's production environment create security vulnerabilities, are challenging to move to the cloud environment, and are prone to break, threatening a company's ongoing operations every day. The legacy applications must be replaced.

Integration: Software programs need to talk to other software programs more than ever before. To communicate and share data they use software apps, APIs (application programming interfaces), which are complex and specialized, requiring significant time to build.

Unfortunately, there are impediments and bottlenecks to digital transformation efforts. These barriers reduce productivity and reduce the quality of the software applications/programs that are produced. Some of the more important ones are:

Shortage of software developers: There is an estimated shortage of 1 million experienced programmers in North America. Companies are held hostage by lack of talent; productivity suffers, long delays to complete projects, growing backlogs of projects obstruct competitiveness and profitability.

Software development process: The process to develop software has not changed in decades. At the core, software programs are built through writing code "by hand". By its nature, this process is inefficient and lacks excellent tools and lacks adherence to common standards, run by individual developers who act more as "artists" who code in their own style.

Object-relational mapping (ORM) is a programming technique for converting data between incompatible type systems using object-oriented programming languages. ORM creates, in effect, a "virtual object database" that can be used from within the programming language.

In one application of ORM, many popular database products such as SQL database management systems (DBMS) are not object-oriented and can only store and manipulate scalar values such as integers and strings organized within tables. ORM tools can be used to translate the logical representation of the objects into an atomized form that is capable of being stored in a relational database while preserving the properties of the objects and their relationships so that they can be reloaded as objects when needed.

US Patent Publication 2010/082646 is one example of Object Relational Mapping (ORM) where a dependency graph generator receives a combination of object level custom commands and store level dynamic commands. Each store level dynamic command is generated from at least one object level dynamic command. The dependency graph generator is configured to generate a dependency graph that includes nodes and at least one edge coupled between a corresponding pair of nodes. Each node is associated with a corresponding store level dynamic command or an object level custom command. An edge is configured according to an identifier associated with the corresponding pair of nodes and a dependency between commands associated with the corresponding pair of nodes.

US Patent Publication 2006/179025 describes a system for managing a knowledge model defining a plurality of entities. The system includes an extraction tool for extracting data items from disparate data sources that determines if the data item has been previously integrated into the knowledge model. The system also includes an integration tool for integrating the data item into the knowledge model only if the data item has not been previously integrated into the knowledge model. Additionally, a relationship tool for identifying, automatically, a plurality of relationships between the plurality of entities may also be provided. The system may also include a data visualization tool for presenting the plurality of entities and the plurality of relationships.

US Patent Publication 2013/145348 describes a software application platform that abstracts a computing platform, a database layer, and a rendering medium. A platform-independent application programming interface is disclosed, as well as an abstract database layer. The abstraction of the database layer comprises two sub-layers, including a layer having a uniform interface that treats data records as plain objects and a layer having constructs that facilitate the automated generation of user interfaces for data record navigation and management. Further, a software application platform that is independent of rendering medium is disclosed.

SUMMARY OF PREFERRED EMBODIMENTS

This patent relates to techniques for automatic code generation from a model. The model is generated from an input data source. In one example, the data source may be a legacy database. However, prior to generating code, the data model is analyzed to detect anomalies such as normalization and rationalization form issues. The system then attempts (with limited to no developer input) to script contextualized solutions that resolve or at least improve the issues discovered. In addition, the detected issues are used to determine a quality score for the model. The quality score may be weighted by issue type. Code generation is not permitted to continue until the quality score exceeds a threshold.

Among the benefits of this approach is that a better data schema results, providing cascading positive effects in both maintenance, speed and coding efficiencies.

More particularly, the approach may then read the data and metadata of the model, automatically generating an application that contains thousands or millions of lines of code, to produce a full enterprise software application. The generated stack may contain many components, including data access layer, logic tiers, web Application Programming Interface (API), web User Interface (UI), unit tests, and documentation. Any time a change is made to the database model, which may happen often, the application may be regenerated to stay in synch with the change in the database; easily again completed in a few minutes, saving weeks or months of programmer work. Indeed, because the entire stack is automatically produced in a few minutes, the software application even may be regenerated many times a day, if needed. Applications are thus always new, fresh, and never become old, legacy applications.

In one example use case, an organization may use this approach to migrate an application from a legacy, on-premises technology platform to a cloud native, API based technology stack.

In that use case, the system consumes a physical database model from the legacy application or if a physical database model is not available, then builds a new abstract model as a starting point. The system then analyzes and scores this model, recommending and implementing resolutions that will improve the quality of code generation. The analysis may compare that model against metrics such as normalization, rationalization, form conventions and the like. Once the score passes a threshold, the physical database model is used to generate an abstract model. The abstract model in turn, including any resulting data and metadata, are used to generate a full enterprise class code framework. The framework may include database code (such as MySQL, SQL, Oracle or PostgreSQL in some examples), as well as other artifacts such as .Net, .Net Core or Java components.

Core source code (including many business rules generated directly from the data model), libraries, web API, web UI, unit testing, documentation, solution files and abstracted model are generated. The output may be containerized using dockers and deployed on a cloud platform. Changes may be made to the physical database model or to the abstract model (and scripted to the DB) and new code generated incorporating the changes made to the DB without losing extended, customized code, such as special business rules or enhanced UI. Generated granular entity level micro API's (REST, OData, and GraphQL) work as a microservices layer to operate on the data. These micro data centric APIs in conjunction with developer defined business or functional rules may be exposed for any front end (UI/UX) to facilitate end user interface.

BRIEF DESCRIPTION OF THE DRAWINGS

Additional novel features and advantages of the approaches discussed herein are evident from the text that follows and the accompanying drawings, where:

FIG. 10 is another example of how resolutions may be reported to the developer.

DETAILED DESCRIPTION OF ILLUSTRATIVE EMBODIMENT(S)

System Overview

Figure 1:
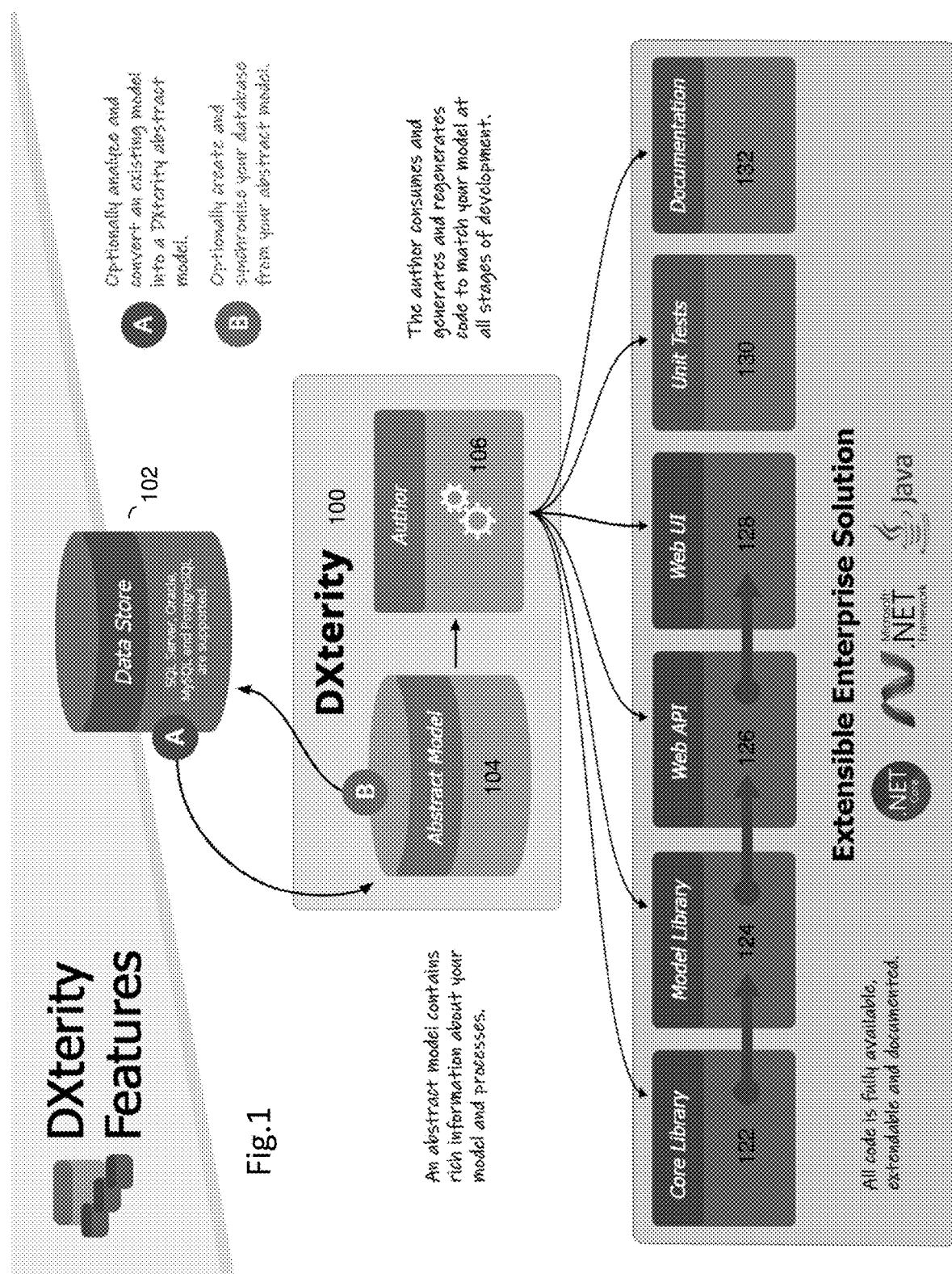
FIG. 1 is a high-level diagram of the features of an example system for automatic code generation.

As explained above, the present invention relates to a system and methods that may consume a data source and transform it into an abstract model. The abstract model may then be extended and then used to automatically generate base code, Application Programming Interfaces (APIs), User Interfaces (UI), documentation, and other elements. Each of the generated base code, generated base APIs and generated base UIs may be extended. Extended elements are maintained in a framework, such as a different source code file, separately from generated based code elements. More details for one example method of generating code are provided in the co-pending patent applications already incorporated by reference above. The abstract model acts as an intermediary between data models and/or conceptual entity relationship diagrams and code.

Of specific interest herein is that before generating code, the model is first analyzed to detect normalization, rationalization, naming conventions, structure conventions, and other anomalies. The analysis is scored, and the score may be weighted according to selected metrics. The analysis also suggests scripted solutions for resolving the discovered anomalies. For example, scripts to add missing foreign key references, to add foreign key tables, to add primary keys, to normalize column data types, to normalize column names, so forth may be suggested. The developer may then choose to implement one or more of the suggested solutions prior to code generation.

The score may be compared to a threshold and the result used to gate subsequent actions. For example, generation of code from the abstract model may be prevented until such time as the score meets at least a minimum threshold score.

An example implementation will now be described and shown, starting with FIG. 1. Here a data source, such as data store 102, is made available to a productivity platform 100 referred to herein as DXterity. The data store 102 may, for example, be a database associated with a legacy software application. However, it should be understood that the source may not necessarily be a legacy application but some newer application. The data store may be in any common form such as MySQL, SQL Server, DB2, Oracle, Access, Teradata, Azure, PostgreSQL or the like.

DXterity 100 is then used to generate an abstract model 104 from the input data store 102. The abstract model 104 is then fed to an author 106. The author 106 automatically consumes the model 104 to generate and regenerate code to match the model 104. The author may generate the code in certain forms, and also generate other artifacts related to the model 104. For example, the author 106 may generate or may use a core code library 122 and/or model library 124. But the author may also generate application base logic, a web application interface 126, a user interface 128, unit tests 130, and/or documentation 132 from the abstract model.

The input source may describe the data in a database in other ways, such as via an entity relationship diagram, as explained in more detail below. The abstract model is generated in a particular way to help ensure that the resulting code 122, 124 conforms to expected criteria. For example, DXterity 100 may be configured to ensure that the resulting generated code and artifacts 122-132 provide an extensible, enterprise-class software solution. As will be understood from the discussion below, this is accomplished by ensuring that the model itself conforms to certain metrics or conventions prior to code generation.

Enterprise class software is computer software used to satisfy the needs of an organization rather than individual users. Enterprise software forms integral part of a computer-based information system that serves an organization; a collection of such software is called an enterprise system. These enterprise systems handle a chunk of data processing operations in an organization with the aim of enhancing the business and management reporting tasks. The systems must typically process information at a relatively high speed and can be deployed across a variety of networks to many users. Enterprise class software typically has, implements or observes many of the following functions or attributes: security, efficiency, scalability, extendibility, collaboration, avoidance of anti-patterns, utilization of software patterns, architected, designed, observes naming and coding and other standards, provides planning and documentation, unit testing, serialized internal communication, tiered infrastructure, exception management, source code and version control, and includes interfaces for validation, messaging, communication, cryptography, localization, logging and auditing.

Figure 2:
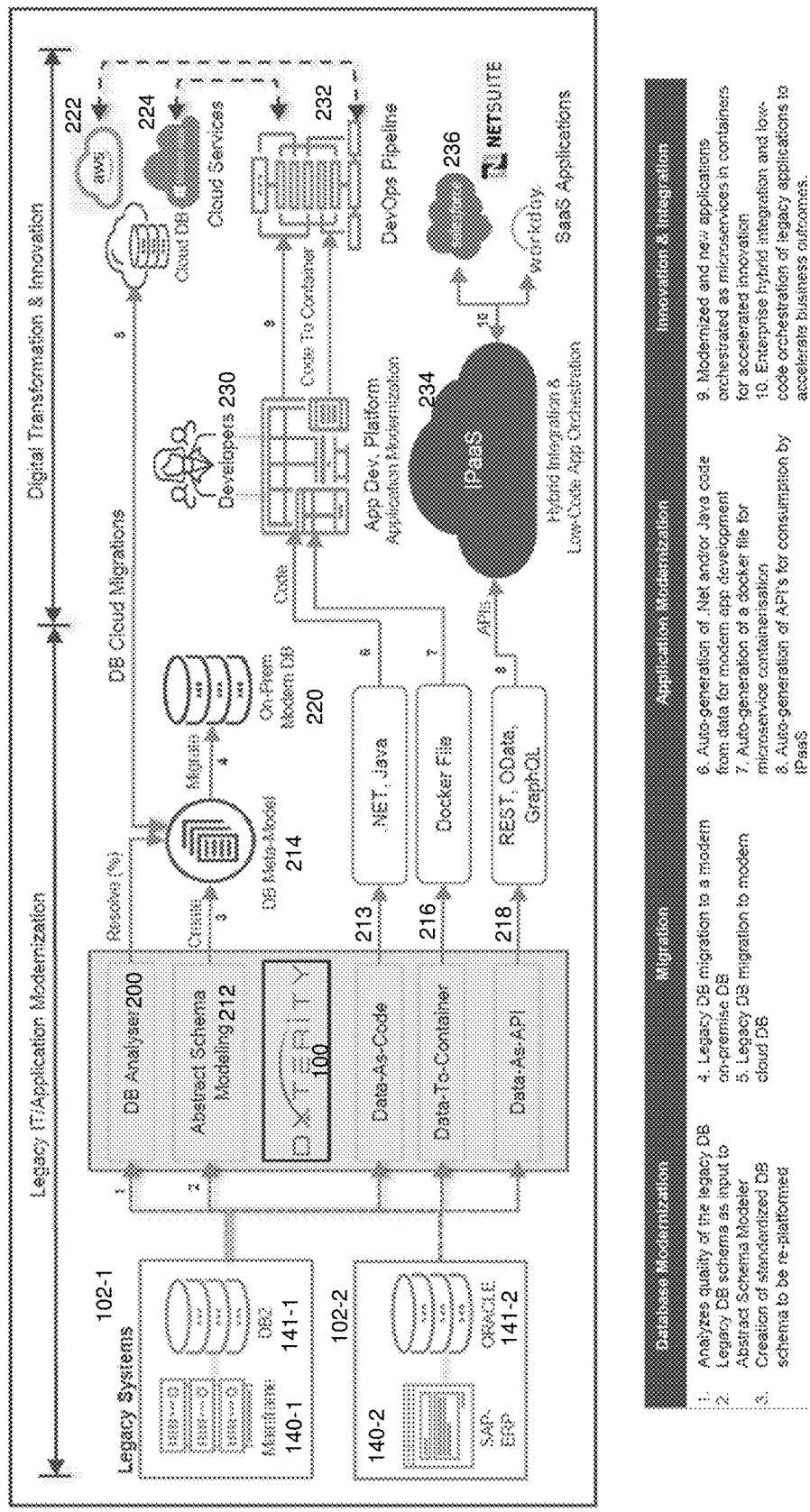
FIG. 2 is more detailed view of one use case.

FIG. 2 illustrates an example implementation in a bit more detail than FIG. 1. Here there are two input data stores, respectively associated with two legacy systems 102-1, 102-2 including an IBM mainframe 140-1 running a DB2 instance 141-1 and an SAP/ERP application 140-2 accessing an Oracle database 141-2.

The DXterity platform 100 consists of an analyzer component 200 and a schema modelling component 212. The schema modelling component 212 generates abstract models of the legacy databases 141-1, 141-2.

The analyzer component 200 analyzes the abstract models of the legacy databases 141-1, 142-2 against selected metrics, generates a score, and recommends resolutions to improve the scores.

A standardized database schema is then output from DXterity 100 as a meta model 214. The meta model 214 may then be re-platformed in various ways. For example, it may be migrated to an on-premise modern database 220. Or the meta model may be migrated to a cloud provider 222 or as a cloud service 224.

Artifacts generated by the DXterity platform 100 may also be fed to other related functions, including an application development platform 230 that drives DevOps pipelines 232, or integration/orchestration environments 234 that support specific application development platforms 236.

Also, of interest is that the DXterity platform 100 may be used to generate its result as data-as-code 213 (e.g., as .NET, or Java), data-to-container 216 (e.g., as a Docker file), or data-as-API 218 (e.g., as REST, OData, GraphQL, etc.).

Figure 3:
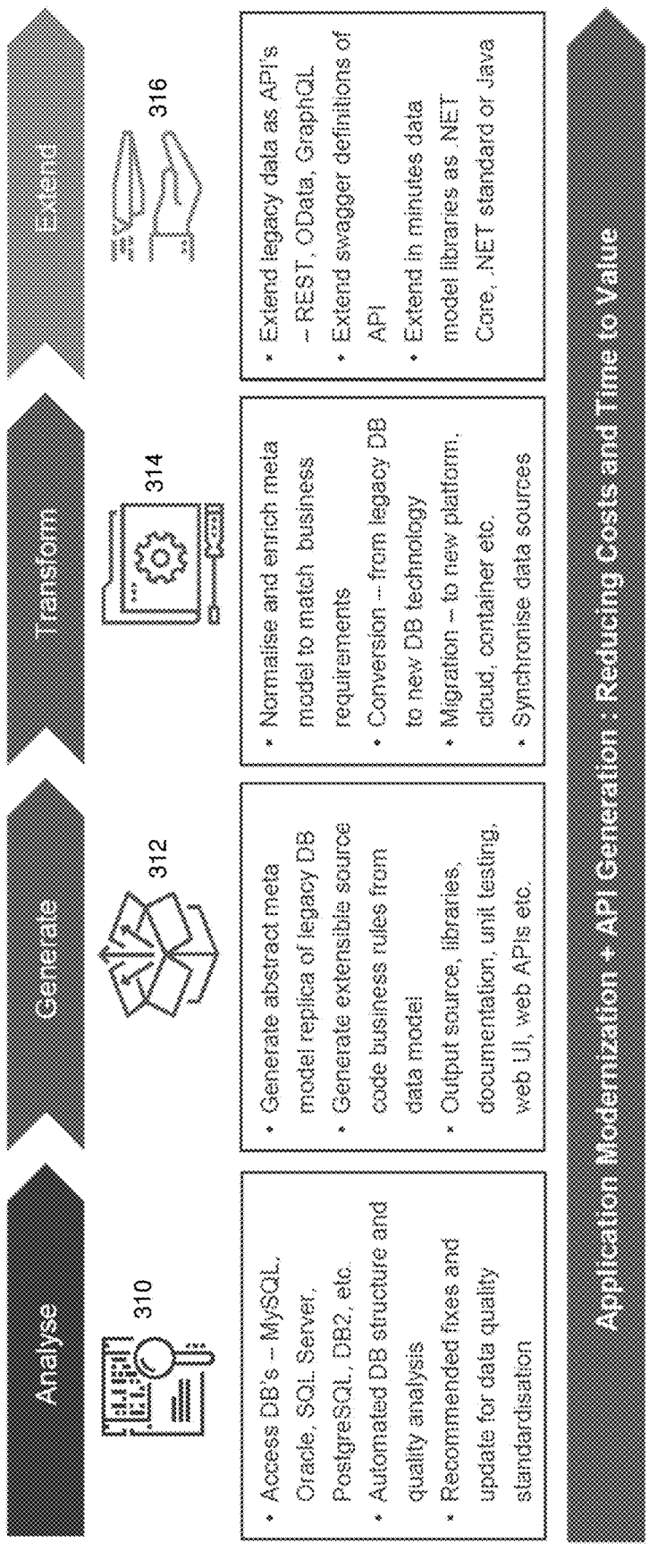
FIG. 3 lists some of the high-level steps in one preferred process.

FIG. 3 is a more particular list of the functions that may be performed by DXterity 100 towards generating an extensible enterprise class solution, including analysis 310, model generation 312, transformation 314 and extension 316.

The analysis function 310 automatically analyzes the structure of the input data store(s) or models thereof, generates a quality score, and recommends fixes or updates for any anomalies that are negatively impacting the quality score.

The generating function 312 generates the abstract meta-model mentioned previously. Code generated from this meta-model may be extensible, enterprise class source code conforming to the metrics enforced in the analysis function 310. The result may include not only source code and libraries, but also related documentation, user interfaces, APIs and the like.

The transformation function 314 may normalize or enrich the model to match particular business requirements. This may, for example, convert data from a legacy database format to a new database technology, or migrate the data to new platforms, the cloud, or containers, or synchronize different data sources. In other implementations, new data from an input source in one format may be converted to another format.

Extension functions 316 may extend data as APIs (through a REST, OData, GraphQL), or extend swagger definitions or .NET Core, .NET standard, or Java as required.

Figure 4A:
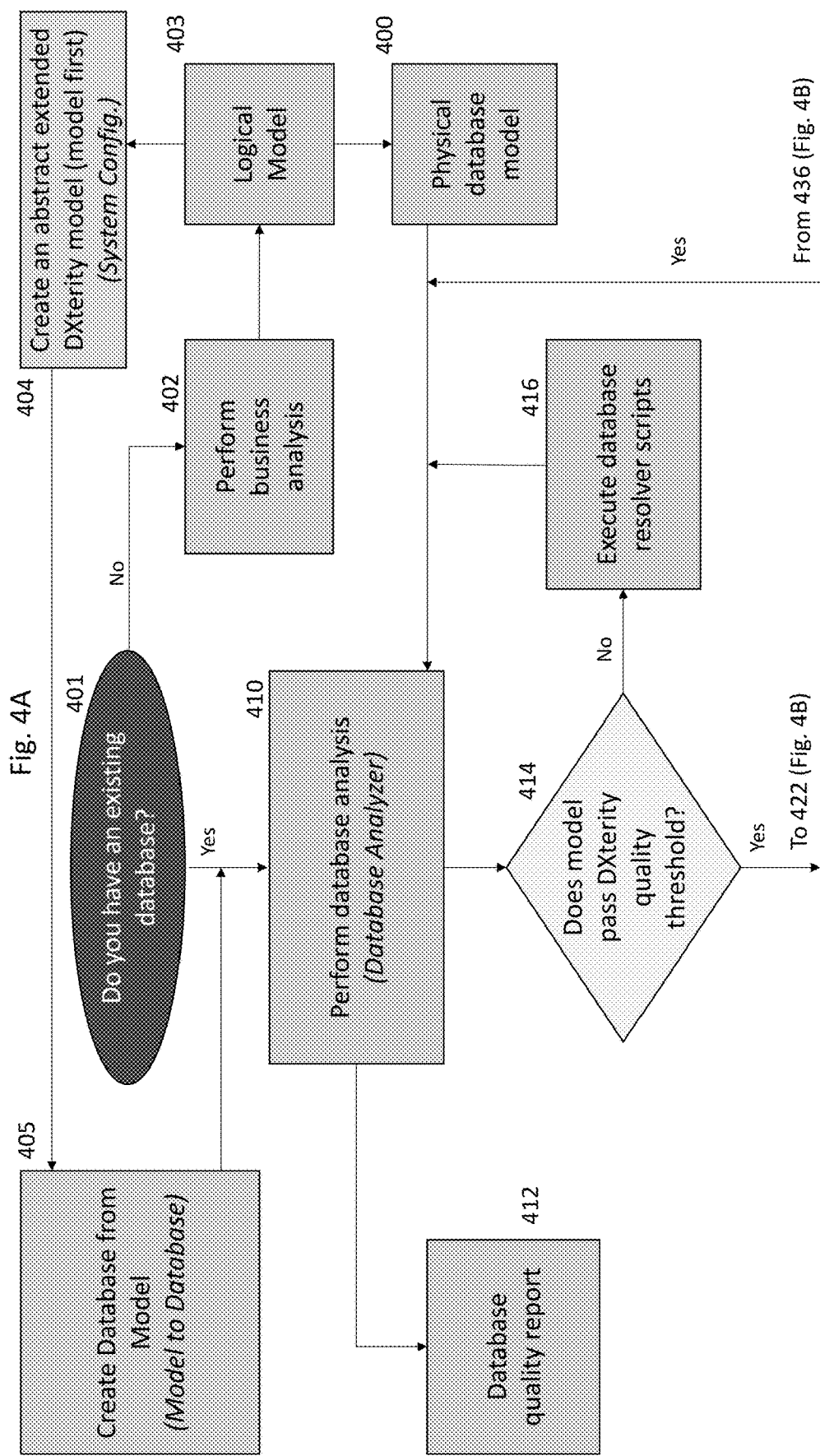
FIGS. 4A and 4B are a logical flow of the abstract model generation, analysis and resolution.
Figure 4B:
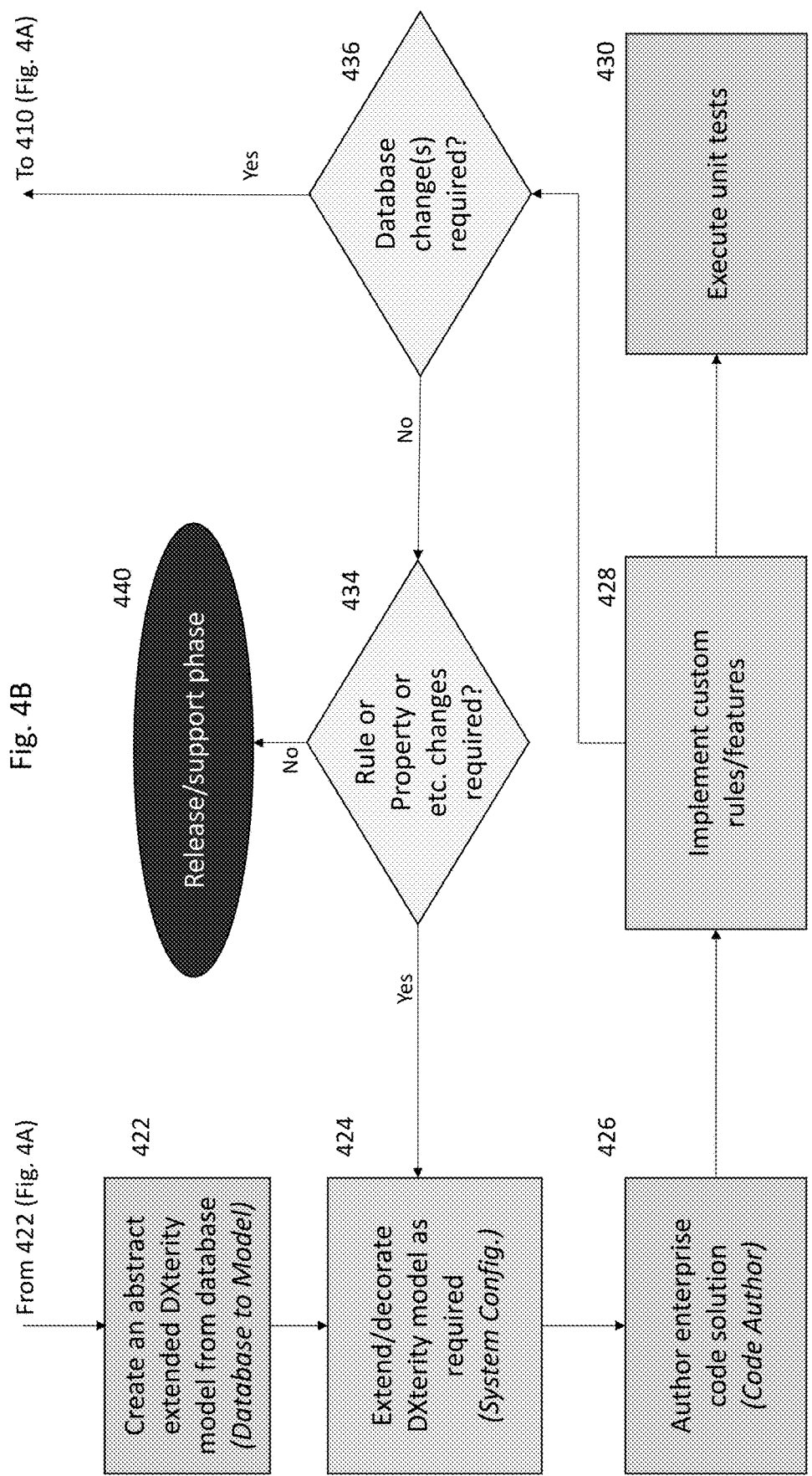

FIGS. 4A and 4B are a more detailed process flow of a typical analysis function 310. The process may start at state 401 to determine if a legacy database exists. If not, then state 402 may involve having a database architect perform a business analysis and in state 403 devise a logical model in state 404 from which a database is provided at 405.

In any event, state 410 is reached at which an input database exists. In this state, analysis of the database is performed (as will be described in detail below). The output of analysis is a database quality report 412.

Next, in state 414 a determination is made as to whether or not the quality report indicates the database passes a quality threshold.

If that is not the case then state 416 is entered where one or more resolutions (or scripts) identified by the analysis state 410 may be identified. In state 418 these scripts are presented to a developer who may optionally select one or more of the scripts to be executed against the database. Once these scripts are executed processing returns to state 410 where the database is analyzed again.

Once the database passes the quality test in state 414, state 422 is reached where the abstract model may then be generated from the database.

In state 424 the model may be further processed, for example, to author code at 426, to implement custom rules or features 428, or to execute unit tests 430.

If subsequent changes are required or detected, this may be handled at state 434 and 436. Finally, once these changes are satisfactorily resolved, the model may be released in state 440.

Figure 5:
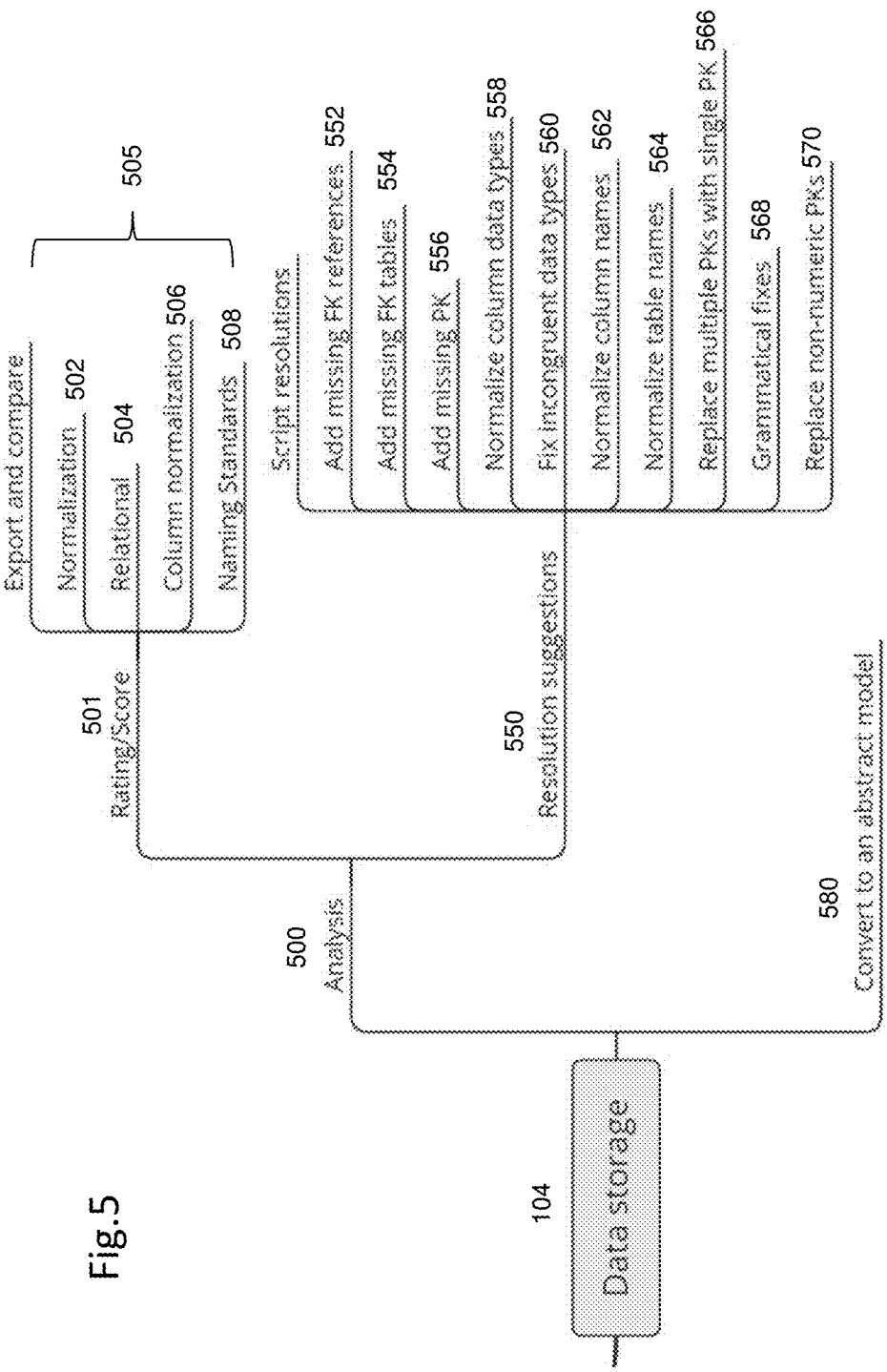
FIG. 5 is a hierarchy of some example rating metrics and resolution suggestions for detected anomalies.

FIG. 5 illustrates possible analysis 500, scoring 501 and resolution 550 considerations in more detail. Scoring 501 may score the input data model 104 against one or more metrics 505. The metrics 505 may include normalization 502, relational attributes 504, column normalization 506 or naming standards 508. More generally, the analysis may involve determining whether or not the database is observing preferred enterprise class criteria such as proper naming conventions, structure conventions, normalization forms, amenability to relational predicate logic and so forth.

Corresponding resolutions, associated with the metrics 505, may be proposed in state 550. Scripted resolutions may include, for example, adding missing foreign key references 552, adding missing foreign key tables 554, and missing primary keys 556, normalizing column data types 558, fixing an incorrect data types 560, normalizing column names 562, normalizing table names 564, replacing multiple primary keys with a single primary key 566, grammatical fixes 568 and for replacing non-numeric primary keys 570. It should be understood that other resolution suggestions are possible it should also be understood that other ratings analysis metrics may also be implemented. Only after the quality score at analysis 500 reaches a threshold is the conversion step 580 allowed to proceed.

Figure 6:
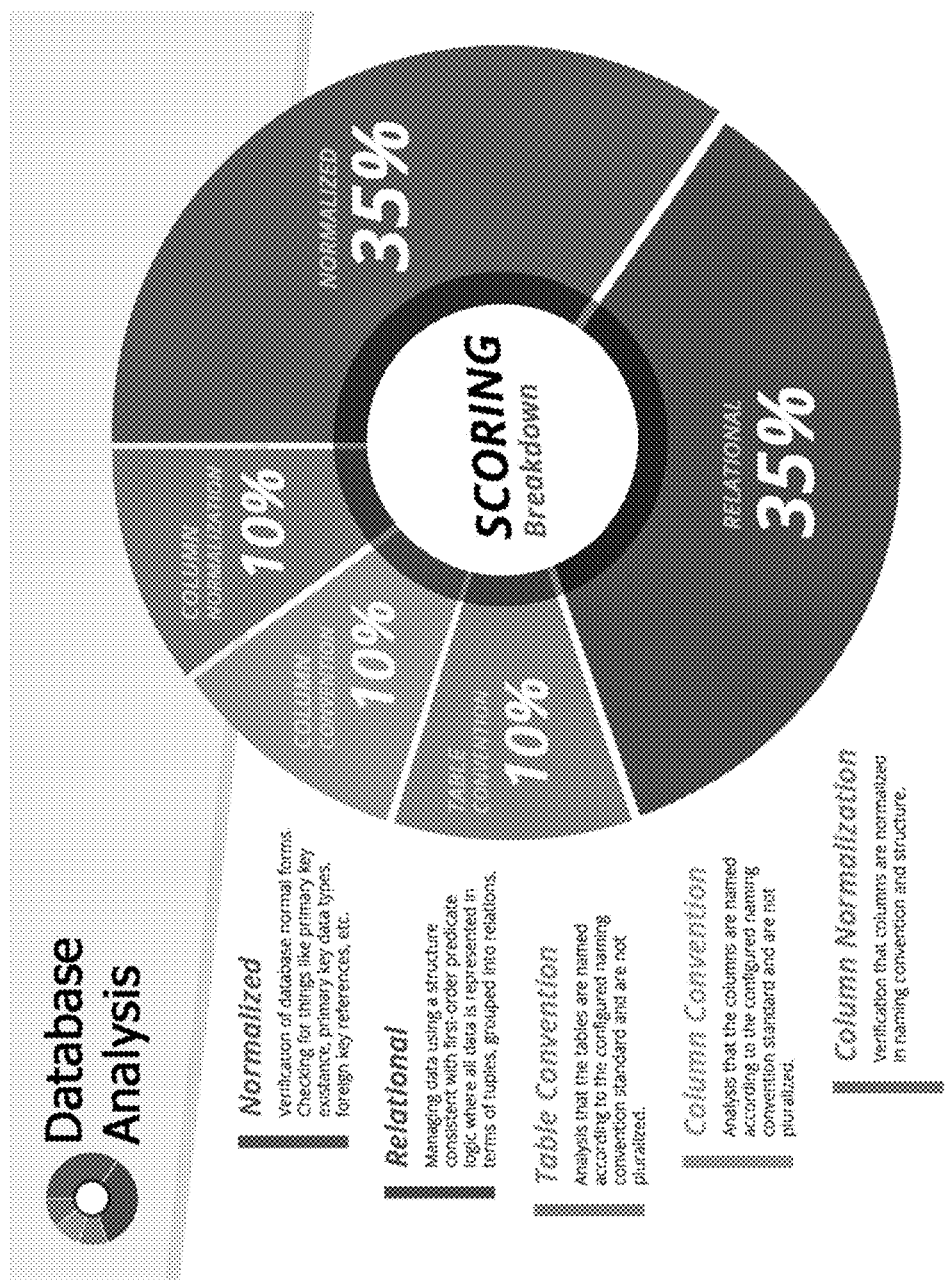
FIG. 6 is an example of a weighted quality score.

FIG. 6 is an example of how the analysis may generate a weighted score from the metrics 505. In this particular example, the architect has determined that normalization forms (for example checking things like primary key existence, primary key data types and foreign key references) should be weighted at 35% of the total. Relational-related metrics such as whether structures are consistent with predicate logic, or grouped into relations) should also be given a 35% weight. Table and column conventions are each respectively given a 10% weight and column normalization issues given a 10% weight.

The scoring metric may count the total number of metrics 505 (anomalies) of a particular type in the database, and then weight that count according. For example, a given database analysis may count anomalies in at least each of the following areas resulting in a score of 0.8 in normalization form quality, 0.6 in relational quality, 1.0 in table convention quality, 0.3 in column convention quality, and 0.4 in column normalization quality. The scores from each quality area may then be calculated as a weighted score such as:

| 0.35 | 0.35 | 0.10 | 0.10 | 0.10 |      | Weighted ratios   |
|------|------|------|------|------|------|-------------------|
| 0.80 | 0.60 | 1.00 | 0.30 | 0.40 |      | Individual scores |
| 0.28 | 0.21 | 0.10 | 0.03 | 0.04 | 0.66 | Final score       | to obtain a final score of 0.66 out of a best possible 1.0, then expressed as a percentage to the developer.

Figure 7:
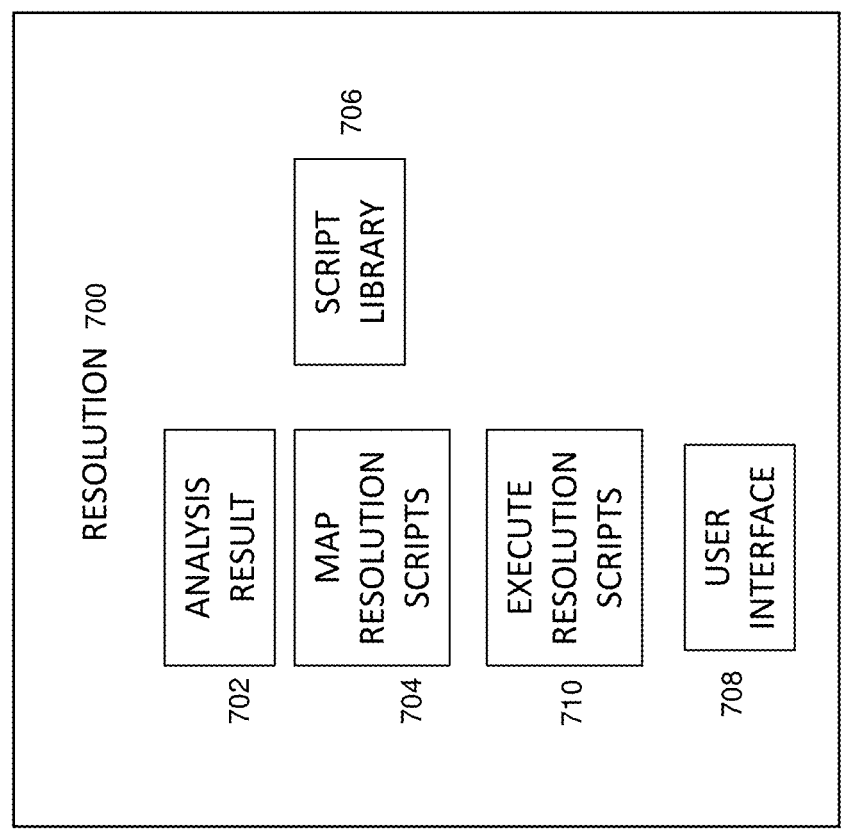
FIG. 7 is a block diagram of analysis and resolution functions.

FIG. 7 is an example of the components of DXterity that may implement the resolution function 416. Resolution takes any resulting issues (or anomalies) determined in the analysis 702 and maps 704 appropriate scripts from a script library 706. The scripts may be presented via a user interface 708 where the developer may determine whether or not to execute 710 selected ones of the resolution scripts. It should be understood that, for example, a given database may have multiple naming convention anomalies. If the developer chooses, she may decide to resolve only some of those anomalies instead of all of them. Generally speaking, anomalies may include relational, normalization, column normalization, table convention, or column convention anomalies.

It should also be understood that the analysis may detect certain anomalies that are not amenable to automatic resolution. In this instance the fact of such anomalies may be presented to the developer at 708 for manual resolution. It is estimated that for most situations, the percentage of anomalies that are not auto-correctable will be relatively low actually, on the order of 10 to 15%.

Figure 8:
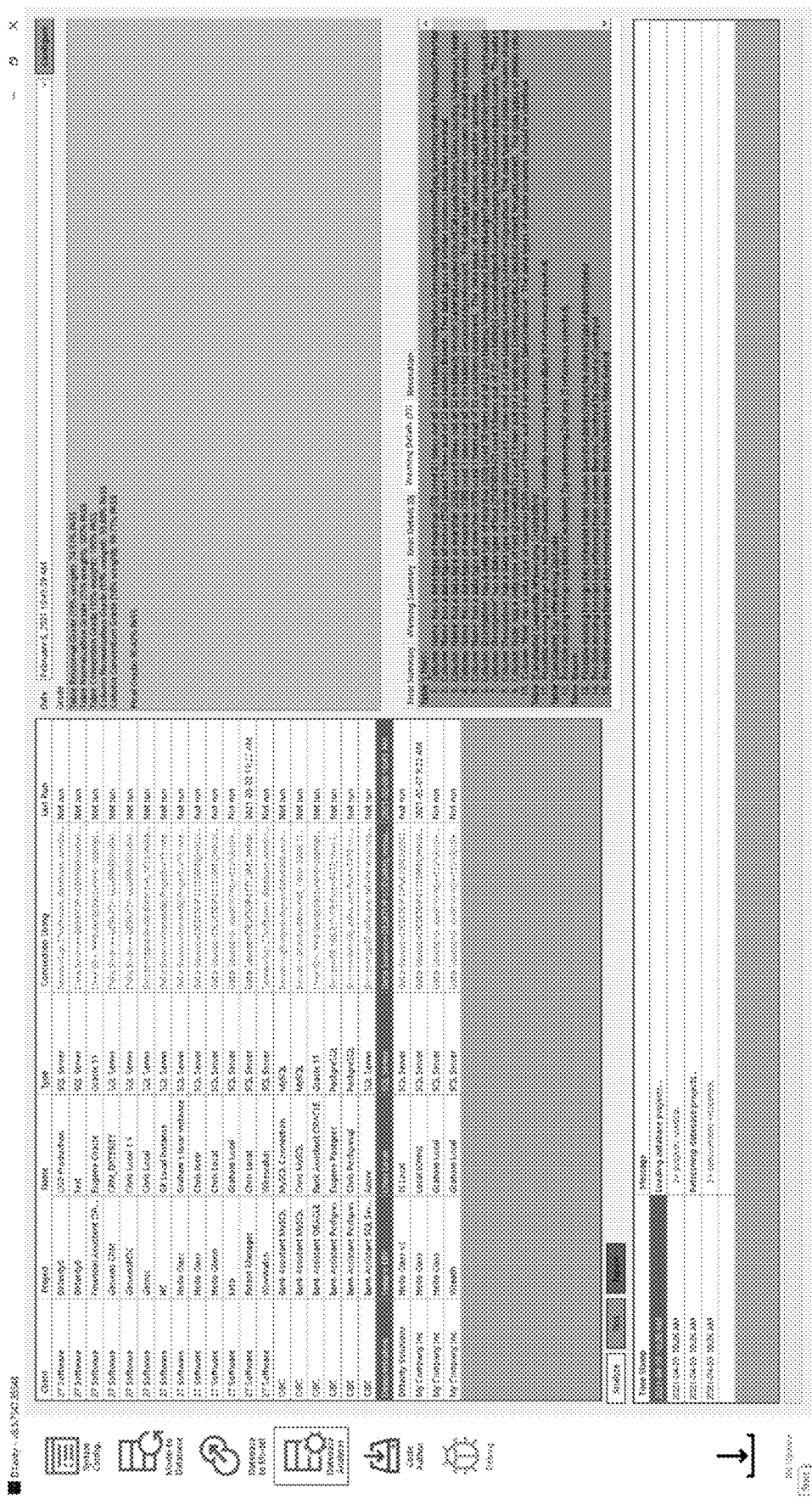
FIG. 8 is an example user interface screen illustrating detected warnings.

FIG. 8 is an example of an interface that may be presented to a developer to report the analysis result. Here, 37 warnings, shown on the bottom right of the screenshot, have been generated. The interface may permit the developer to scroll through and further examine these. Note that for example there were three missing foreign key column references (items 13, 14 and 15). Note that a corresponding script will be identified needs resolve each of the three missing references.

Although the analysis here is generated as a user interface, it should be understood that the analysis result may also be generated in other ways such as an HTML, file.

Figure 9:
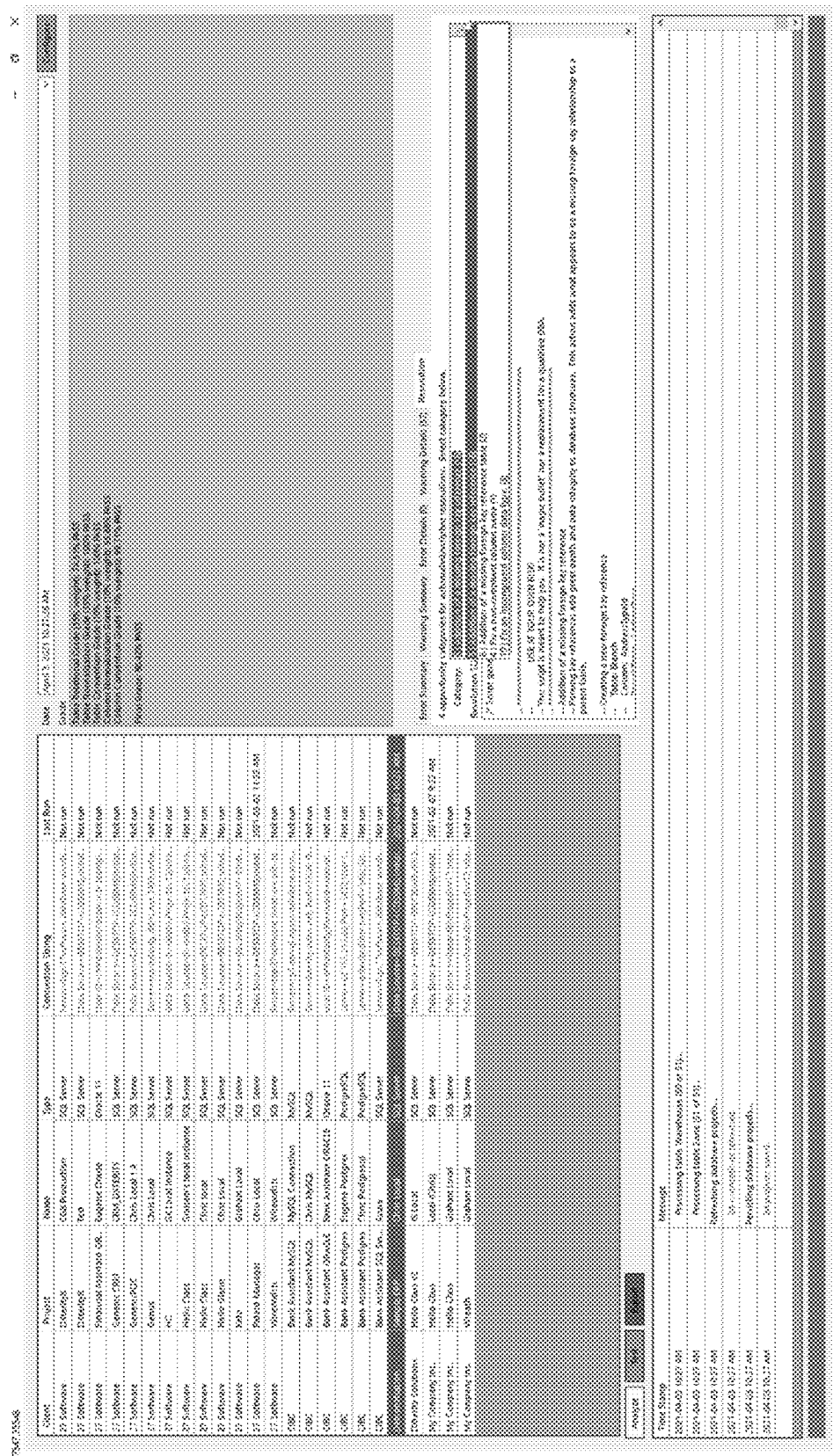
FIG. 9 is an example user interface screen illustrating a proposed resolution.

FIG. 9 is an example of how the developer may view the details of a resolution script prior to its execution. Here the developer is investigating warning number 4, which was a non-compliant column name. A proposed script for renaming the non-complaint column name is presented to the developer for their review. At this stage the developer may approve the automatically generated script or they may reject it. Note the script is generated based on the technology implemented in the database (here being SQL Server).

Other features of the user interface may permit configuring which anomalies should be detected. For example, a developer may not wish DXterity to be concerned with pluralization issues in a certain database. These may be set in the configuration option 700.

It is also the case that analysis results may be versioned. In particular, the system may retain a history of all generated analyses for a database including warnings and proposed resolutions, to permit subsequent comparative analysis. Having a history of implemented resolutions may further assist the developer in implementing corrections.

Figure 10:
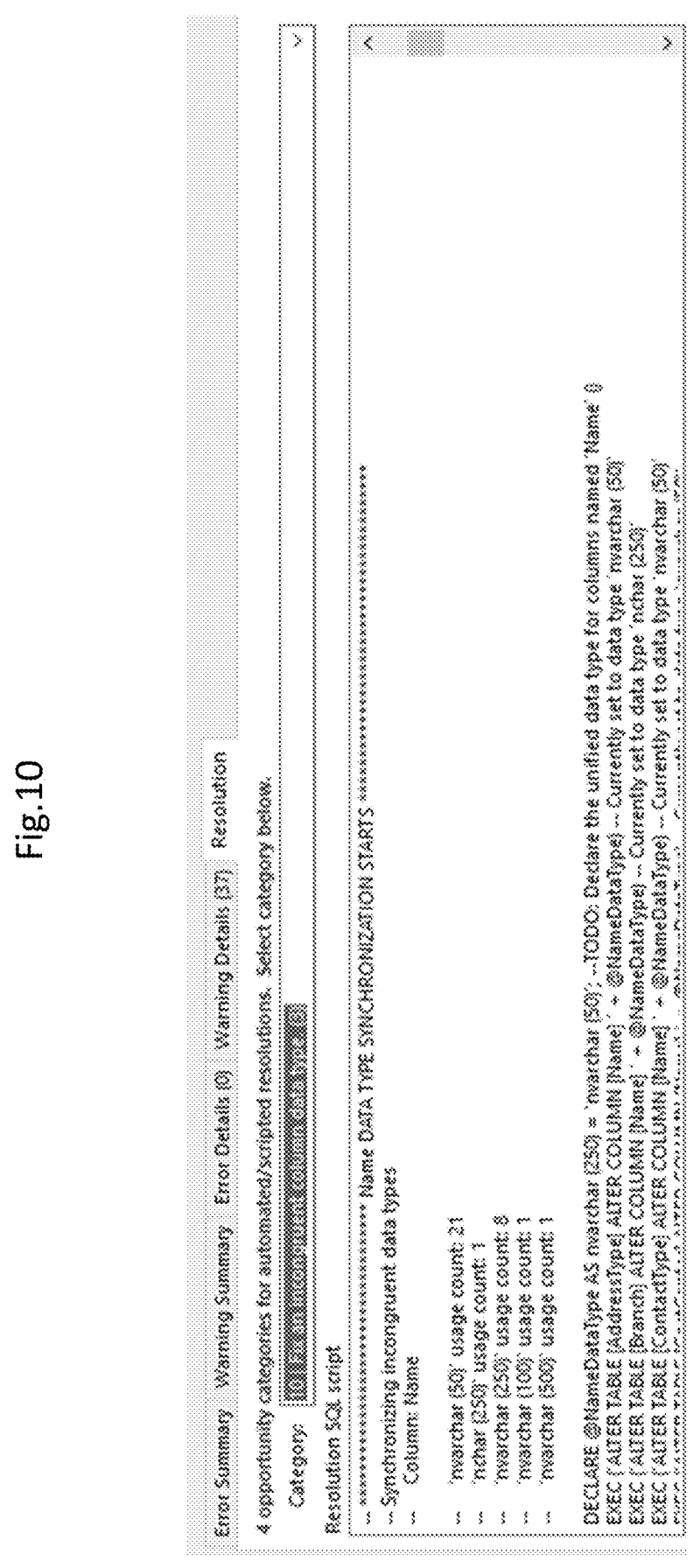

FIG. 10 is another user interface screen which may be viewed when resolutions are executed. Here the system is reporting to the developer that it has added missing foreign key reference for a table, corrected a column name, and fixed three instances of an incongruent column data type.

Figure 11:
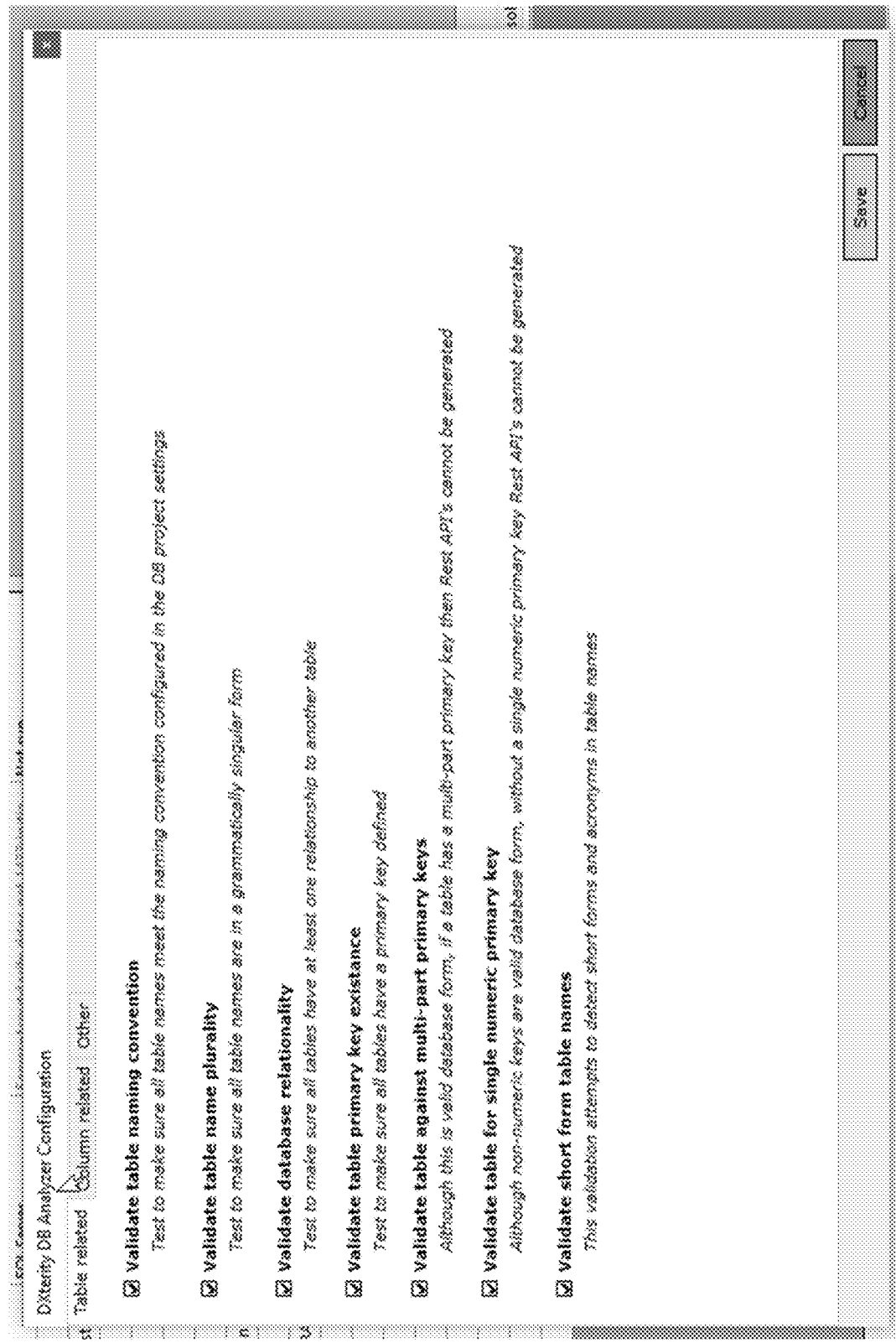
FIGS. 11 through 13 are an example interface for selecting configuration options for the analyzer.
Figure 12:
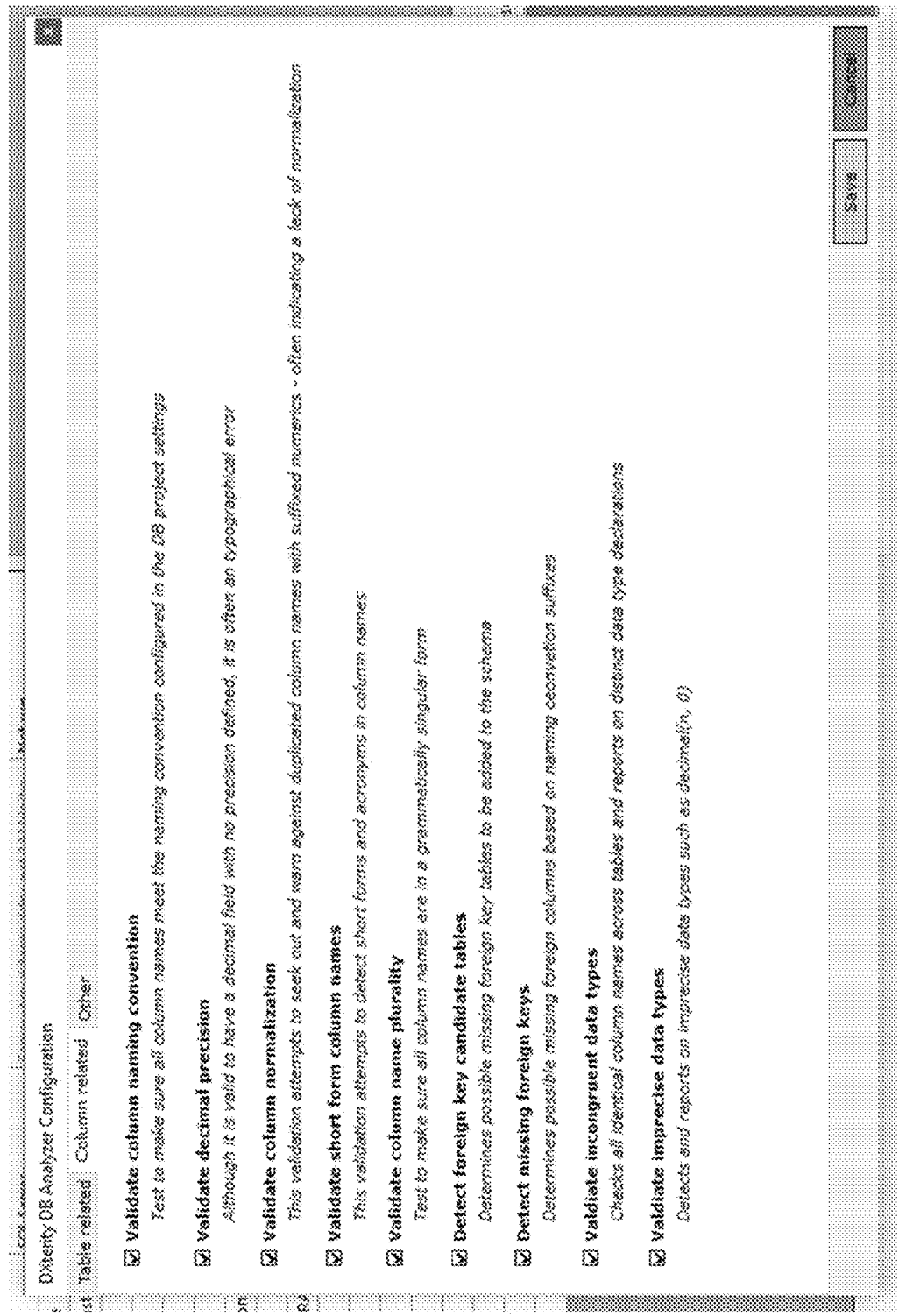
Figure 13:
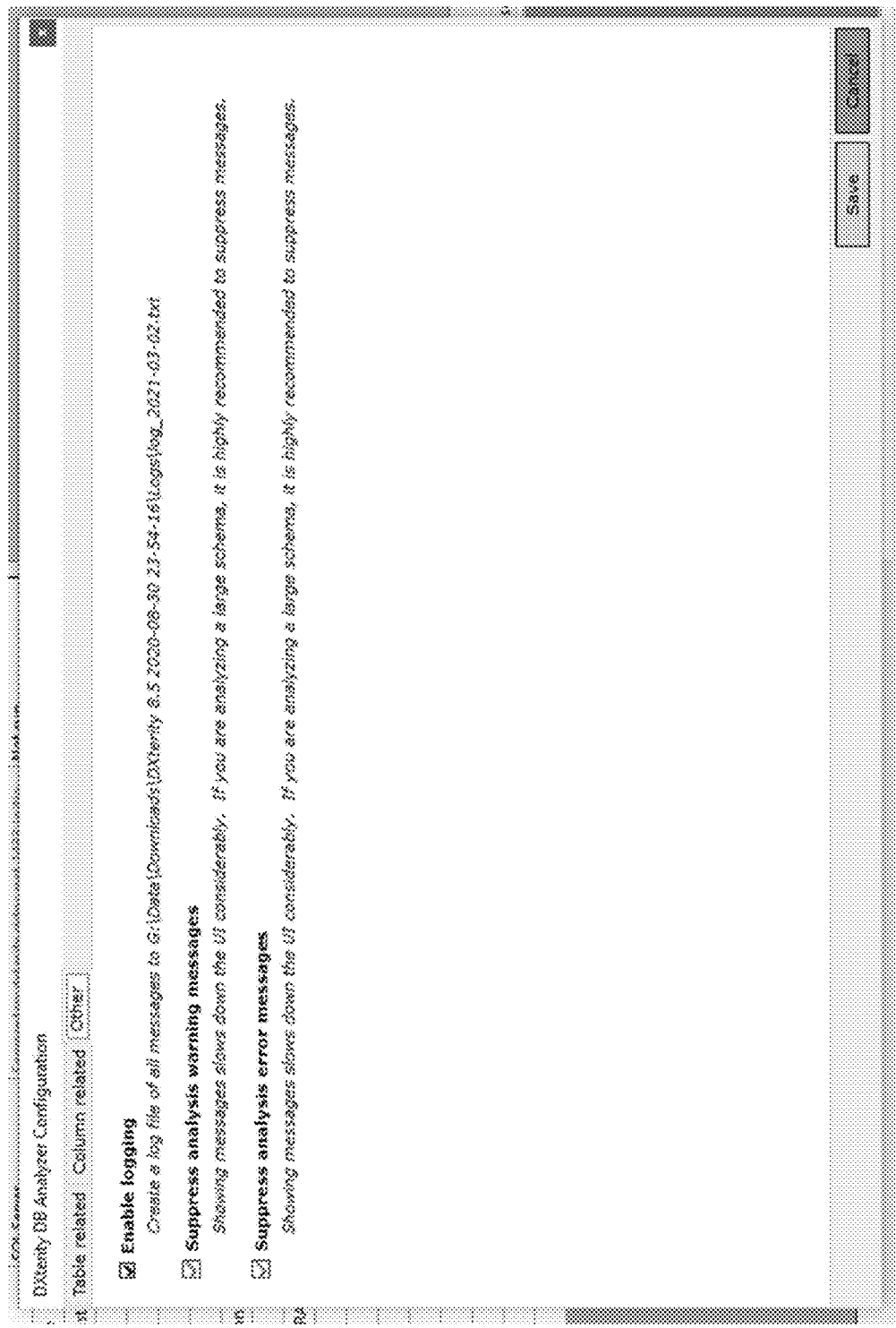

FIGS. 11 through 13 are example interface screen where the configuration options 700 for the database analyzer may be set by the developer. Some possible configuration options 700 include:

Validate table naming convention (make sure all table names meet a predetermined naming convention)

Validate table name plurality (make sure table names are in a grammatically singular form)

Validate database relationality (make sure all tables have at least one relationship to another table)

Validate table primary key existence (make sure all tables have a primary key defined)

Validate table against multi-part primary keys (although a valid database form, if a table has a multi-part primary key, then warn developer Rest APIs cannot be generated)

Validate table for single numeric primary key (although non-numeric keys are valid database form, without a single numeric primary key, then warn developer Rest APIs cannot be generated)

Validate short form table names (detect short form names or acronyms in table names)

Validate column naming convention (make sure all column names meet the naming convention configured in the project settings)

Validate decimal precision (Although it is valid to have a decimal field with no precision defined, it is often a typographic error)

Validate column normalization (seek out and warn against duplicated column names with suffixed numerics, which often indicate a lack of normalization)

Validate short form column names (attempts to detect short forms and acronyms in column names)

Validate column name plurality (make sure all column names are in a grammatically singular form)

Detect foreign key candidate tables (determine possible missing foreign key tables to be added to the schema)

Detect missing foreign keys (check for possible missing foreign columns based on naming convention suffixes)

Validate incongruent data types (checks all identical column names across tables and reports on distinct data type declarations)

Validate imprecise data types (detects imprecise data types such as decimal (n, 0))

Enable Logging

Suppress Analysis Warning Messages

Suppress Analysis Error Messages

Further Implementation Options

It should be understood that the example embodiments described above are not intended to be exhaustive or limited to the precise form disclosed, and thus may be implemented in many different ways. In some instances, the various "data processors" may each be implemented by a separate or shared physical or virtual or cloud-implemented general-purpose computer having or having access to a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments of the components may therefore typically be implemented in hardware, firmware, software or any combination thereof. In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that may be rapidly provisioned and released with minimal management effort or service provider interaction. Such cloud computing deployments are relevant and typically preferred as they allow multiple users to access computing. By aggregating demand from multiple users in central locations, cloud computing environments may be built in data centers that use the best and newest technology, located in the sustainable and/or centralized locations and designed to achieve the greatest per-unit efficiency possible.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block, flow, network and code diagrams and listings may include more or fewer elements, be arranged differently, or be represented differently.

Other modifications and variations are possible in light of the above teachings. For example, while a series of steps has been described above with respect to the flow diagrams, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

Certain portions may be implemented as "logic" that performs one or more functions. This logic may include hardware, such as hardwired logic, an application-specific integrated circuit, a field programmable gate array, a microprocessor, software, wetware, or a combination of hardware and software. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

Also, the term "user", as used herein, is intended to be broadly interpreted to include, for example, a computer or data processing system or a human user of a computer or data processing system, unless otherwise stated.

Also, the term "developer" as used herein, is intended to refer to a particular type of user who is enabled to create software applications or systems that run on a computer or another device; analyze other users' needs and/or then design, develop, test, and/or maintain software to meet those needs; recommend upgrades for existing programs and systems; and/or design pieces of an application or system and plan how the pieces will work together.

The above description has particularly shown and described example embodiments. However, it will be understood by those skilled in the art that various changes in form and details may be made therein without departing from the legal scope of this patent as encompassed by the appended claims.

The invention claimed is:

1. A method for generating code from a model of an application and a data store, wherein the model includes a schema for the data store, comprising:

analyzing the model to determine two or more anomalies therein, wherein the two or more anomalies are data quality attributes selected from a group consisting of at least one of relational, normalization, or naming conventions;

determining a quality metric based on the two or more anomalies; and generating code from the model only when the quality metric is above a predetermined threshold, wherein the code is selected from scripted code solutions for resolving the anomalies discovered during the analyzing step.

2. The method of claim 1 wherein the two or more anomalies are further selected from a group consisting of column normalization, table convention, column convention, incongruence, duplication, pluralization, or imprecise data type description.

3. The method of claim 1 additionally comprising:
determining one or more resolutions that resolve the anomalies in the model; and
applying the one or more resolutions to the model.

4. The method of claim 3 additionally comprising:
locating all places in the model that exhibit each anomaly; and
generating scripts to apply the resolution to each such place.

5. The method of claim 3 wherein the resolutions include one or more of:
adding missing foreign key references;
adding missing foreign key tables;
adding missing primary key;
normalizing column data types;
addressing incongruent data types;
normalizing column names;
normalizing table names;
replacing multiple primary keys with a single key;
grammatical fixes; or
replacing non-numeric primary keys.

6. The method of claim 4 wherein the resolutions relate to relational, normalization, column normalization, table convention, column convention, or enterprise-class aspects of the generated code.

7. The method of claim 4 wherein the scripts are selected from a script library having been automatically generated for each of a corresponding two or more database technologies.

8. The method of claim 4 additionally comprising:
presenting the scripts to a developer for determining selected scripts;
executing the selected scripts against the model.

9. The method of claim 4 wherein the scripts are in a format specific to a database technology.

10. The method of claim 8 additionally comprising:
performing the analyzing step one or more additional times after the selected scripts are executed.

11. The method of claim 1 additionally comprising:
forwarding the quality metric and model to an automatic code generation process.

12. A system for generating code from a model of an application and a data store, wherein the model includes a schema for the data store, comprising:
a computing platform having one or more processors and one or more computer readable memory devices;
program instructions embodied by the one or more computer readable memory devices, the program instructions causing one or more of the processors, when executed, for:
analyzing the model to determine two or more anomalies therein, wherein the anomalies are data quality attributes selected from a group consisting of at least one of relational, normalization, or naming conventions;
determining a quality metric based on the two or more anomalies; and
generating code from the model only when the quality metric is above a predetermined threshold, wherein the code is selected from scripted code solutions that resolve the anomalies discovered during the analyzing.

13. The system of claim 12 wherein the anomalies are further selected from a group consisting of column normalization, table convention, column convention, incongruence, duplication, pluralization, or imprecise data type description.

14. The system of claim 12 additionally comprising:
determining one or more resolutions that resolve the anomalies in the model; and
applying the one or more resolutions to the model.

15. The system of claim 14 additionally comprising:
locating all places in the model that exhibit each anomaly; and
generating scripts to apply the resolution to each such place.

16. The system of claim 15 wherein the resolutions include one or more of:
adding missing foreign key references; adding missing foreign key tables;
adding missing primary key;
normalizing column data types;
addressing incongruent data types;
normalizing column names;
normalizing table names;
replacing multiple primary keys with a single key;
grammatical fixes; or
replacing non-numeric primary keys.

17. The system of claim 15 wherein the resolutions relate to relational, normalization, column normalization, table convention, column convention, or enterprise-class aspects of the generated code.

18. The system of claim 15 wherein the scripts are selected from a script library having been automatically generated for each of a corresponding two or more database technologies.

19. The system of claim 15 additionally comprising:
presenting the scripts to a developer for determining selected scripts; and
executing the selected scripts against the model.

20. The system of claim 15 wherein the scripts are in a format specific to a database technology.

21. The system of claim 18 additionally comprising:
performing the analyzing step two or more times after the selected scripts are executed.

22. The system of claim 12 additionally comprising:
forwarding the quality metric and model to an automatic code generation process.

23. A computer program product comprising a non-transitory computer usable storage medium having readable program code embodied in the storage medium, the computer program product includes at least one component of an enterprise class code generation platform operable for:
analyzing a database model, wherein the database model includes a schema for a data store, to determine two or more anomalies therein, wherein the two or more anomalies are selected from a group consisting of relational, normalization, or naming conventions;
determining a quality metric based on the two or more anomalies; and generating code from the model only when the quality metric is above a predetermined threshold, wherein the code is selected from scripted code solutions that resolve the anomalies discovered during the analyzing.

\* \* \* \* \*